United States Patent [19]

Wilkinson et al.

[11] Patent Number: 4,803,567
[45] Date of Patent: Feb. 7, 1989

[54] VIDEO REPLAY STORE FOR A MULTI-CHANNEL DIGITAL VIDEO TAPE RECORDER

[75] Inventors: James H. Wilkinson, Yokohama, Japan; Richard J. A. Avis, Basingstoke, United Kingdom

[73] Assignee: Sony Corporation, Tokyo, Japan

[21] Appl. No.: 925,377

[22] Filed: Oct. 30, 1986

[30] Foreign Application Priority Data

Nov. 6, 1985 [GB] United Kingdom ............... 8527321

[51] Int. Cl.⁴ .............................................. H04N 5/78
[52] U.S. Cl. ................................. 360/33.1; 360/10.1; 358/335
[58] Field of Search ..................... 360/10.1–10.3, 360/33.1; 358/335, 160

[56] References Cited

U.S. PATENT DOCUMENTS 4,251,830  2/1981  Tatami .
4,361,849  11/1982 Bolger .
4,376,290  3/1983  Shirota .
4,430,675  2/1984  Fujime ........................ 360/10.1 X
4,698,698  10/1987 Collins ........................ 360/10.3 X

FOREIGN PATENT DOCUMENTS 0153820  5/1985  European Pat. Off. .
0160539  11/1985 European Pat. Off. .

OTHER PUBLICATIONS

Patent Abstracts of Japan, vol. 9, No. 266 (E-352), (1989), Oct. 23, 1985.

Primary Examiner—Aristotelis M. Psitos
Attorney, Agent, or Firm—Lewis H. Eslinger

[57] ABSTRACT

A video replay store for a multi-channel digital video tape recorder, comprises a respective channel store for each channel, each channel store comprising a plurality of field stores which are written in and read from cyclically, a respective field boundary detector for each channel, each field boundary detector supplying a first pulse in response to each field boundary where an odd field changes to an even field, and a second pulse in response to each field boundary where an even field changes to an odd field, in the off-tape data in the respective channel, and a replay store controller for supplying write requests and read requests in a predetermined sequence to all of the channel stores, the replay store controller stepping on to the next state in the predetermined sequence in response to each first first pulse following a second pulse and each first second pulse following a first pulse.

7 Claims, 5 Drawing Sheets

VIDEO REPLAY STORE FOR A MULTI-CHANNEL DIGITAL VIDEO TAPE RECORDER

BACKGROUND OF THE INVENTION

1. Field of the Invention

This invention relates to video replay stores.

2. Description of the Prior Art

A digital video tape recorder (DVTR) necessarily requires a video replay store to form the interface between the DVTR, which supplies off-tape asynchronous data streams, and television apparatus synchronized to, for example, a 625-line 50 fields per second or 525-line 60 fields per second television system. The primary function of the video replay store is picture assembly, but it is usual to include other functions, such as data de-shuffling, time-base correction, picture synchronization and error flag management.

Particularly in the case of a multi-channel DVTR, the hardware is somewhat complex because of the number of field stores required, and the complexity is increased still further if the DVTR is to be operable in so-called stund modes, that is, at forward and reverse speeds different from the normal reproduction speed, and including the still mode. In such a DVTR some problems arise with the replay store.

Firstly, in the head drum of a DVTR it is physically impossible to align the heads so that each channel reads data at exactly the same time. Even if it were possible, the exact relationship between data of different channels could not be maintained due to, for example, mechanical instability. Therefore it must be assumed that each channel completes the writing of a field of data in the video replay store independently of the others. At this point the channel will then request a store change from the controller. With all the channels asynchronously requesting store changes, and since the stores of all the channels must change together, because eventually all the channels will be combined to form a single output, some means is necessary to combine these store change requests.

Secondly, even under normal operational conditions, it is perfectly possible for one or more channels to fail. This can occur due to head clog, drop-out, head damage, high error rates or circuitry failure. Under these conditions it is required that the remaining channels continue to operate correctly, even to the extreme of operating on one channel alone. In effect this means that signals from the stores, and in particular request for store change from any one store, cannot be relied upon; and that so long as at least one store is operating correctly, store changes should continue.

Thirdly, requests to read from or write in a given store must be correctly synchronized with the store operation, that is with the memory control signals, in order to prevent memory crashes. Synchronization is usually achieved by synchronizing the read enable with the read circuitry of the store, and the write enable with the write circuitry. As a result it is possible, for example, for the write enable to be synchronized and hence request the store to start writing before the read enable has been synchronized to stop the store reading. There could therefore be contention between the reading and writing of a store.

SUMMARY OF THE INVENTION

One object of the present invention is to provide a video replay store for a multi-channel digital video tape recorder, the replay store comprising respective channel stores each comprising a plurality of field stores, and the replay store having means to combine asynchronous field store change requests.

Another object of the present invention is to provide a video replay store for a multi-channel digital video tape recorder, the replay store comprising respective channel stores each comprising a plurality of field stores, and the replay store having means to maintain continuity of field store changes, even if one or more channels fails.

Another object of the present invention is to provide a video replay store for a multi-channel digital video tape recorder, the replay store comprising respective channel stores each comprising a plurality of field stores, and the replay store having means to prevent contention between the reading and writing of a field store.

According to the invention there is provided a video replay store for a multi-channel digital video tape recorder, the video replay store comprising:

a respective channel store for each channel, each said channel store comprising a plurality of field stores which are written in and read from cyclically;

a respective field boundary detector for each channel, each said field boundary detector supplying a first pulse in response to each field boundary where an odd field changes to an even field, and a second pulse in response to each field boundary where an even field changes to an odd field, in the off-tape data in the respective channel; and a replay store controller for supplying write requests and read requests in a predetermined sequence to all of said channel stores, said replay store controller stepping on to the next state in said predetermined sequence in response to stepping pulses formed by each first said first pulse following a said second pulse and each first said second pulse following a said first pulse.

Preferably each said channel store comprises a control circuit including a first gate circuit for gating each write request received from said replay store controller with a read request received from said replay store controller to derive a first output signal used to form a write enable, and a second gate circuit for gating each read request received from said replay store controller with said first output signal to derive a second output signal used to form a read enable, whereby said control circuit supplies write enables and read enables to said field stores with read enables dominating over write enables in the event of contention.

The above, and other objects, features and advantages of this invention will be apparent from the following detailed description of illustrative embodiments which is to be read in connection with the accompanying drawings.

DESCRIPTION OF THE PREFERRED EMBODIMENTS

The embodiment of video replay store to be described is used with a 4-channel DVTR, the four channels being designated A, B, C, and D respectively. Prior to recording, an outer correction code, such as a Reed Solomon check code is associated with the video data words, and the order of the data words and the outer code check words is then shuffled. The shuffled words are then assembled into blocks of words, with each of which a respective block address and an inner error correction codes comprising one or more further check words for error detection and correction are associated. The data and the outer and inner codes are then demultiplexed into the four channels A, B, C and D for recording; complete blocks with the respective inner codes being allocated to respective ones of the channels A, B, C and D. On replay from the DVTR, the respective reproduced signals from the channels A, B, C and D are supplied to the video replay store.

Figure 1:
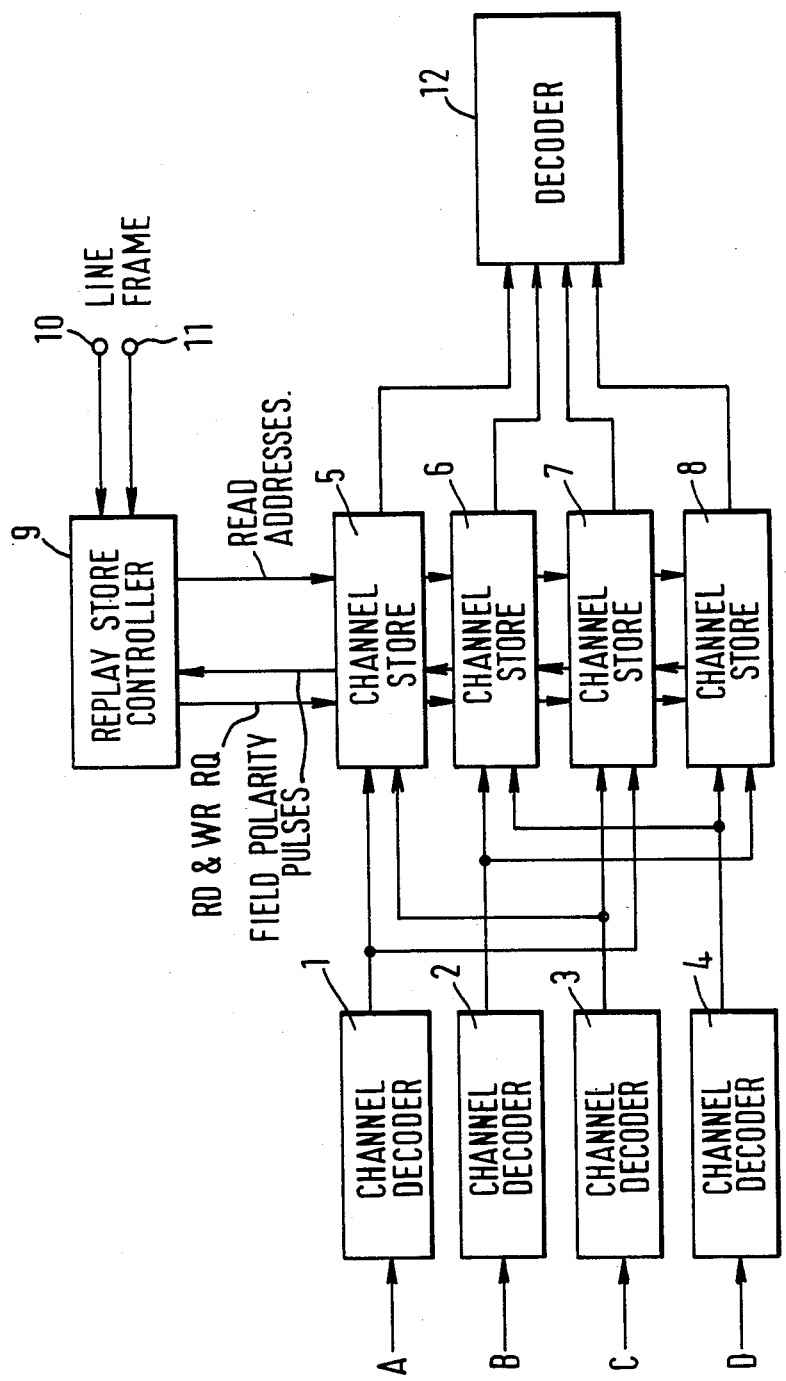
FIG. 1 shows in block diagrammatic form an embodiment of video replay store according to the present invention, with associated inner and outer code decoders.

As shown in FIG. 1, the video replay store is associated with A, B, C and D channel inner code decoders 1, 2, 3 and 4 to which the reproduced signals from the respective channels are supplied, and in which the clock signal is regenerated and the inner codes are used to detect and, where possible, correct errors in the data words. The inner code decoders 1, 2, 3 and 4 also add a further bit to each data word to form an error flag, which indicates whether the data word is correct or may contain an uncorrected error.

The inner code decoders 1, 2, 3 and 4 supply output clock signals, block start signals, data words and error flags to A, B, C and D channel stores 5, 6, 7 and 8, respectively, each of which comprises three field stores described in more detail below. The cross-connections also shown in FIG. 1, for example, from the A channel inner code decoder 1 to the C channel store 7, exist because azimuth-loss recording and reproducing is used, and as the head gap angles are the same in channels A and C, and also in channels B and D, it is possible in stunt mode reproduction for off-tape data in one channel to belong to the other channel with the same head gap angle. However, this is not relevant to the present invention and will not be further described.

The channel stores 5, 6, 7 and 8 are all controlled by a common replay store controller 9 which receives line and frame synchronization pulses by way of terminals 10 and 11 respectively from a system oscillator (not shown), and receives status information including field polarity pulses independently from each of the channel stores 5, 6, 7 and 8. The replay store controller 9 also control the field stores to cycle around the operations of read, write and idle, in particular by supplying read and write requests independently to the channel stores 5, 6, 7 and 8. The clock signals, and the data words and error flags read from the channel stores 5, 6, 7 and 8 are supplied to an associated outer code decoder 12 where the channels are multiplexed, and those data words flagged as being in error are, if possible, corrected using the outer codes. Those data words still flagged as possibly containing an uncorrected error after this stage, are subsequently concealed.

Figure 2:
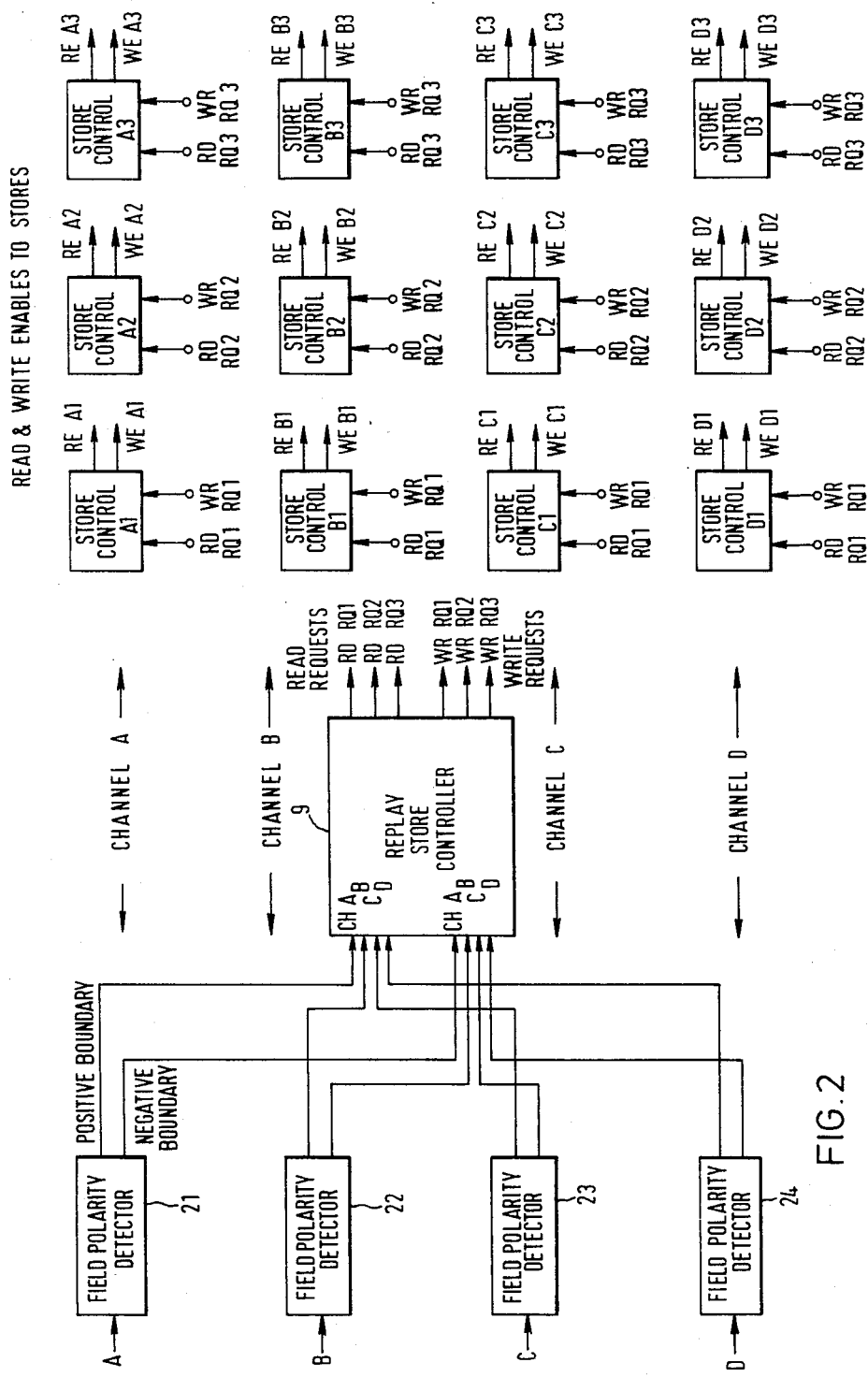
FIG. 2 shows in more detailed block diagrammatic form part of the embodiment of FIG. 1.

FIG. 2 to which reference is now made, shows parts of the embodiment of FIG. 1 in more detail. Each of the channel stores 5, 6, 7 and 8 of FIG. 1 includes a respective field polarity detector 21, 22, 23 or 24 which, using the address header of the reproduced blocks of data words, determines the boundaries between fields of data. Each of the field polarity detectors 21, 22, 23 and 24 has two outputs, one for positive boundaries, defined as transition from a field 0 to a field 1, and one for negative boundaries, defined as a transistion from a field 1 to a field 0. At the respective boundaries, the field polarity detectors 21, 22, 23 and 24 supply negative pulses by way of the respective outputs to the replay store controller 9. The replay store controller 9 supplies read requests (RD RQ) and write requests (WR RQ) to each field store.

As mentioned above, each of the channel stores 5, 6, 7 and 8 (FIG. 1) comprises three field stores. Associated with each field store is a respective field store control circuit, and these are shown on the right-hand side of FIG. 2. Field store control circuits A1, A2 and A3 are respectively associated with the three field stores of channel store 5; field store control circuits B1, B2 and B3 with channel store 6; field store control circuits C1, C2 and C3 with channel store 7; and field store control circuits D1, D2 and D3 with channel store 8. The store controller 9 supplies the read requests RD RQ1, RD RQ2, and RD RQ3 to the respective field store control circuits A1 to D3, and likewise supplies the write requests WR RQ1, WR RQ2 and WR RQ3, to the respective field store control circuits A1 to D3. In dependence on the respective read and write request received from the store controller 9, each field store control circuit A1 to D3 supplies a read enable RE and a write enable WE to the associated field store. For example, the store control circuit A1 supplies a read enable RE A1 and a write enable WE A1, so controlling the associated field store to read, write or remain idle.

Figure 3:
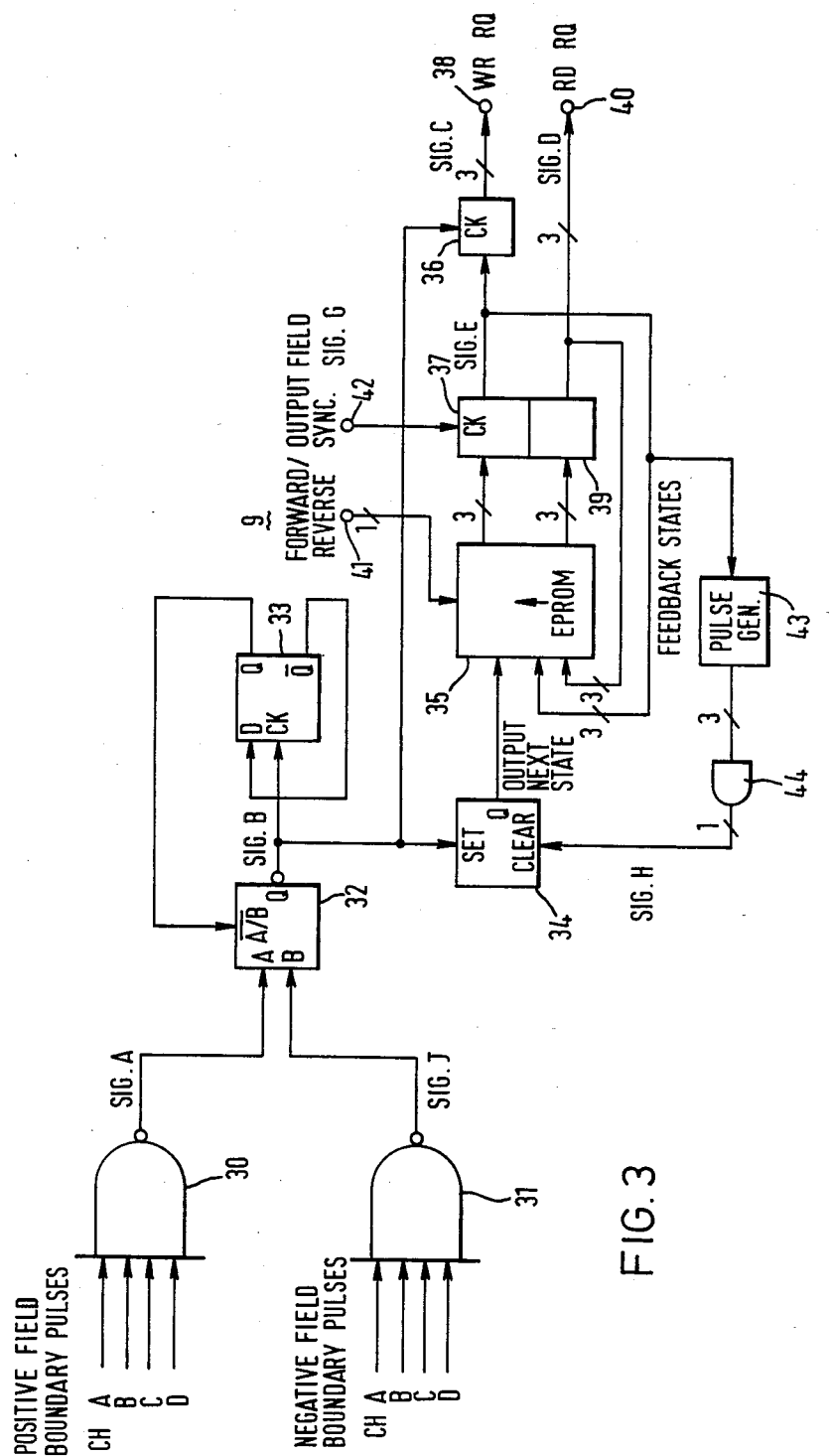
FIG. 3 shows in more detail block diagrammatic form a replay store controller of FIG. 2.

The store controller 9 is shown in more detail in FIG. 3, to which reference is now made, and comprises two four-input nand gates 30 and 31 to which the field polarity detectors 21 to 24 (FIG. 2) respectively supply the four positive field boundary pulses and the four negative field boundary pulses. The outputs of the nand gates 30 and 31 are connected to respective inputs of a 2:1 selector which forms a polarity selector 32, the Q output of which is connected to the clock input of a divide-by-two latch circuit 33. The Q output of the latch circuit 33 is connected to the switching input of the polarity selector 32, while the $\bar{Q}$ output is connected back to the D input of the latch circuit 33.

The Q output of the polarity selector 32 is also connected to the set terminal of a bistable circuit 34 and to the clock terminal of a latch circuit 36. The Q output of the bistable circuit 34 is supplied to an erasable programmable read-only memory (EPROM) 35, respective write and read outputs of which are supplied by way of a latch circuit 37 and the latch circuit 36 to an output terminal 38, and by way of a latch circuit 39 to an output terminal 40. The EPROM 35 is also supplied with write and read feedbacks from the outputs of the latch circuits 37 and 39, and a forward/reverse reproduction signal from a terminal 41. The latch circuits 37 and 39 are controlled by output field synchronization signals supplied to a terminal 42. The write feedback is also supplied by way of a pulse generator 43 which supplies clear pulses by way of a gate 44 to the bistable circuit 34.

Figure 5:
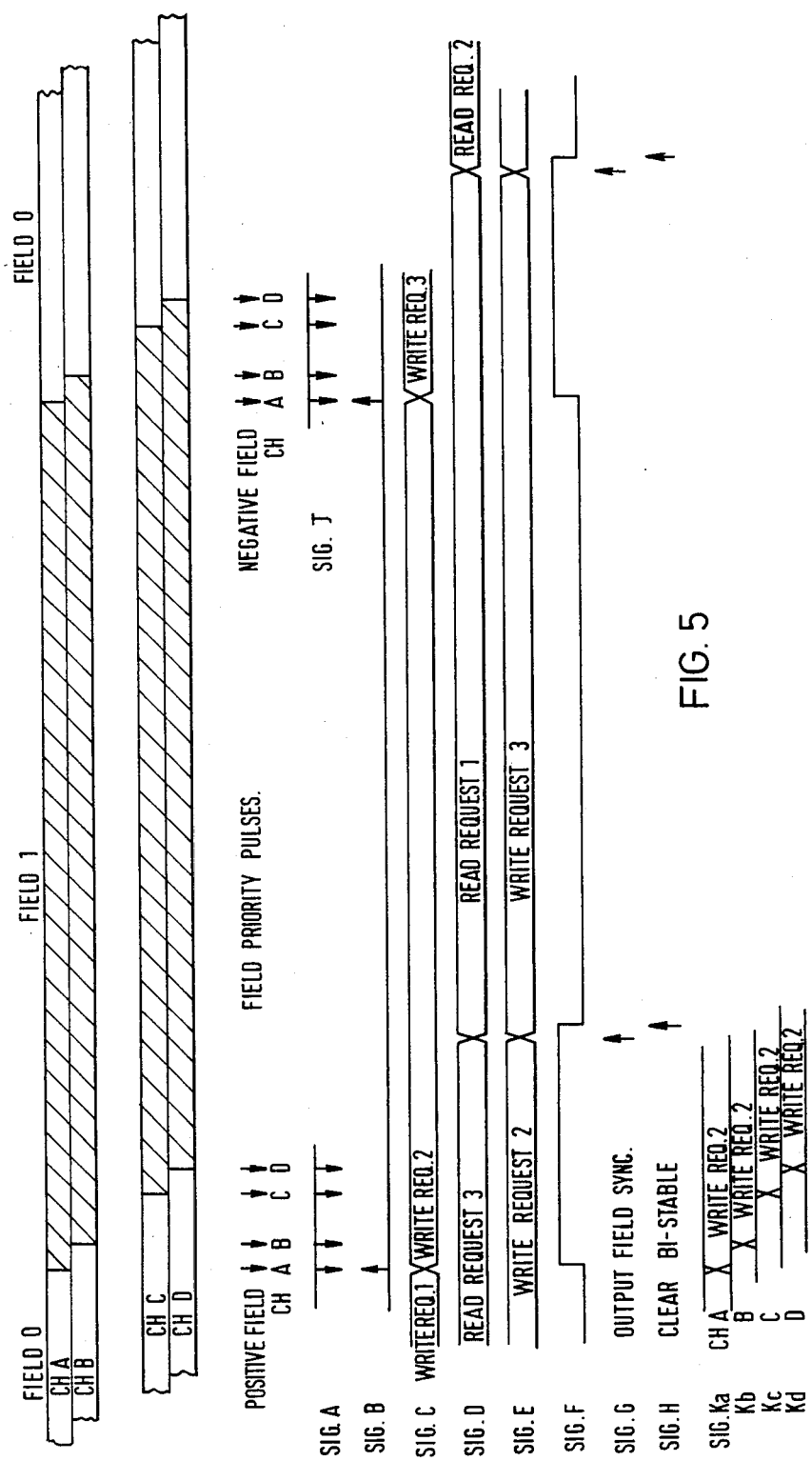
FIG. 5 shows a time chart used in describing the operation of the embodiment.

The operation of the store controller 9 will now be described, with reference also to the time chart of FIG. 5. The order in which the three field stores in each of the channel stores 5 to 8 (FIG. 1) are cycled is determined by the EPROM 35, and will be assumed to be store 1 (that is, the field stores A1, B1, C1 and D1 in the respective channels), store 2, store 3, store 1, . . . An example of how the store control sequence is incremented will now be explained. It will be assumed that currently field 0 is being received off-tape and written into store 1 (A1, B1, C1 and D1), that store 3 (A3, B3, C3 and D3) is being read and the resulting output supplied to the outer correction decoder 12 (FIG. 1), and that store 2 (A2, B2, C2 and D2) is idle.

Each field store A1, B1, C1 and D1 will cease writing as the next field, that is field 1, is received off-tape. Assuming that all the channels are working, channel A will cease writing first and channel D will cease writing last. As shown in the time charts at the top of FIG. 5, as the field boundary is detected in each channel by the respective field polarity detector 21, 22, 23 or 24 (FIG. 2), a positive field polarity pulse will be supplied to the nand gate 30 in the replay store controller 9 (FIG. 3). These positive field polarity pulses are combined by the nand gate 30 to form a signal A (FIG. 5), the first pulse of which is passed by the polarity selector 32, which has been previously set to select the input A, to its Q output to form a signal B (FIG. 5). The signal B clocks the latch circuit 33, so that the polarity selector 32 is re-set to select the input B. Hence the three remaining pulses of the signal A will be ignored. It will be understood that it is only necessary for a field boundary to be detected in one channel for this operation to occur. Failure will only occur when, due for example to head clogging or drop-out, the off-tape signals are lost simultaneously on all four channels, and none of the field polarity detectors 21 to 24 supply a positive field polarity pulse.

The signal B is also supplied to the latch circuit 36. Immediately prior to this a signal C (FIG. 5) supplied to the terminal 38 is WR RQ1, and a signal D (FIG. 5) supplied to the terminal 40 is RD RQ3. In the next state the signal D is RD RQ1 and the signal C is WR RQ2. This latter transition occurs immediately when the signal B clocks the latch circuit 36, causing a signal E (FIG. 5), which is WR RQ2 to become the signal C. Transition of the signal D does not occur immediately; in other words the write request changes before the read request. The new write request WR RQ2 is supplied to each of the appropriate field store control circuits (FIG. 2).

Finally, the signal B causese the EPROM 35 to supply output signals for the next state. This is done by the signal B setting the previously-cleared bistable circuit 34, the resulting output of which causes the EPROM 35 to supply the required output signals, which a little later are latched by the next output field synchronization signal, signal G (FIG. 5) supplied to the latch circuits 37 and 39. Thereupon the new read request RD RQ1 will immediately be supplied from the latch circuit 39 via the terminal 40 to the appropriate field store control circuits (FIG. 2). However, although the signal E will become the new write request WR RQ3, it will not be latched into the latch circuit 36 and be supplied to the terminal 38 until the next pulse in the signal B, and that it will not appear until the next field boundary is detected. The new state of the signal E causes the pulse generator 43 to supply a pulse to the gate 44, which thereupon supplies a pulse, signal H (FIG. 5), to clear the bistable circuit 34.

The replay store controller 9 is then ready for the next off-tape field transition, which is expected to be a negative one; that is, from field 1 to field 0. At this transition, a signal J (FIG. 5) is produced, resulting in another pulse in the signal B and so controlling the supply of the next read and write requests in a similar manner to that described above.

Figure 4:
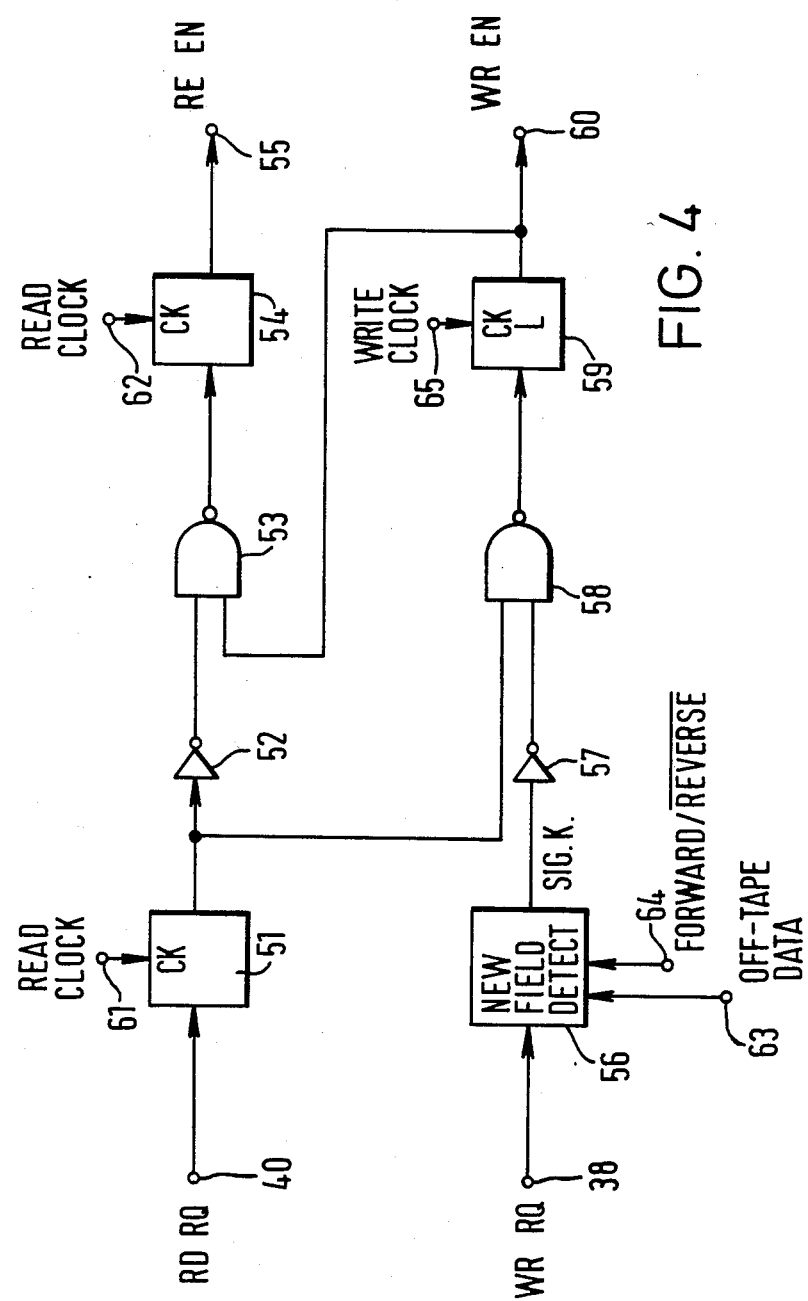
FIG. 4 shows in block diagrammatic form circuitry for preventing store contention.

The read and write requests were stated above to be supplied via the terminals 40 and 38 to the appropriate field store control circuits, each of which is operative to prevent contention between read and write requests. The part of the field store control circuit which prevents such contention will now be described with reference to FIG. 4.

In this part of each field store control circuit, the terminal 40 is connected by way of a latch circuit 51, an inverter 52, a two-input nand gate 53 and a latch circuit 54 to an output terminal 55. The terminal 38 is connected by way of a new field detector circuit 56, an inverter 57, a two-input nand gate 58 and a latch circuit 59 to an output terminal 60. The output of the latch circuit 51 is also connected to the other input of the nand gate 58, and the output of the latch circuit 59 is also connected to the other input of the nand gate 53. The latch circuits 51 and 54 receive read clock signals via terminals 61 and 62 respectively, the new field detector circuit 56 receives off-tape data via a terminal 63 and the forward/reverse reproduction signal via a terminal 64, and the latch circuit 59 receives write clock signals via a terminal 65.

The operation will now be described. As explained above, each field store control circuit receives read and write requests from the replay store controller 9 (FIG. 3). Each write request enables the new field detector circuit 56, which is provided because if all the channels are operating normally, a new write request will be received a few clock cycles after the channel A has seen the new off-tape field. But at this time the other channels B, C and D will not yet have seen the new field. Therefore the new field detection circuit 56 waits until the new field occurs on that particular channel and then supplies a delayed version, signal K (FIG. 5), of the write request. Thus the single write request from the terminal 38 becomes four separate write requests; signals Ka, Kb, Kc and KD (FIG. 5), one for each channel.

The signal K is inverted and then gated with the read request in the nand gate 58. This means that if the field stroe is reading, the write enable at the terminal 60 cannot go active until the reading has been completed. If the field store is not reading, as is usually the case, the inverted signal K will be clocked by a write clock signal in the latch circuit 59 and supplied to the terminal 60 and thence to the field store.

Similarly, when a read request is received, it is clocked by a read clock signal in the latch circuit 51, inverted, and then gated with the write enable in the nand gate 53. Hence if the field store is currently writing, the read request will not be executed. If not, the read request is again latched by a read clcok signal in the latch circuit 54 and supplied to the terminal 55 as the read enable.

In the discussion above of the prior art, three problems were referred to. The way in which embodiments of the present invention can overcome these problems will now be briefly described.

Firstly, the problem of asynchronous store changes. In the embodiment described above, each channel A, B, C and D is being continuously checked for a field boundary, indicating the start of a new field, in the off-tape data. When a field boundary is found, the relevant channel A, B, C or D informs the replay store controller 9. The replay store controller 9 then performs the necessary operations to control the store change, while at the same time ignoring any further "new field" pulses of the same polarity received from the other channels A, B, C and D. Thus, it is always the first new field polarity pulse which begins the control sequence.

Secondly, the problem of channel failure. This is perhaps the most serious of the problems, because the consequence of channel failure is that it cannot be guaranteed that channel A will always start the control sequence, and that channel D will always be the last channel to respond to a new field, as any one or more of the channels may fail to produce off-tape data, for example due to head clogging or drop-out. This means that information about field boundaries; that is indiating new fields, cannot be passed using static control signals; such as, active high means a new field, because if a channel A, B, C or D fails, the control signals will be in an indeterminate state, and could therefore be misinterpreted by the replay store controller 9. In the embodiment described above, therefore, field transitions are used, and it is certain that these transitions will not be present if the off-tape data of the relevant channel A, B, C or D is not present.

The replay store controller 9 operates in dependence on the first field boundary pulse of the opposite polarity to the previous set of field boundary pulses. This means that only one of the channels A, B, C or D need be supplying off-tape data to activate the replay store controller 9. If, for example, the channels A, B and C have failed, then the channel D will be the first to activate the replay store controller 9. On the other hand, if the channels B, C and D have failed, then the replay store controller will be activated by the field boundary pulse from the channel A, since the replay store controller 9 is made operative by the first field boundary pulse received, and does not wait for all four of the pulses to be received. It is a corollary of this that the replay store controller 9 needs a field boundary pulse of the opposite polarity for it be activated.

Finally, the problem of store contention is solved in the embodiment described above by gating the read and write requests with each other. Thus an unstable situation is prevented by having each write request first gated by a read request. The resulting signal is then used to gate the read request, which is used to form the read enable. Hence the read request dominates in situations where otherwise there would be contention.

Thus it will be understood that the embodiment described solves all three of the above problems, and moreover does so in a way which is independent of the mode in which the associated DVTR is operating. That is, there is no charge in the basic manner of operation of the video replay store with changes in the mode of the DVTR, and in particular with changes in the speed or reproduction.

Various changes can be course be made without departing from the invention as defined by the appended claims. In particular, the invention is applicable to multi-channel DVTRs with a plurality of channels other than four, for example, a two-channel DVTR.

The invention is also applicable to arrangements where each channel store has a plurality of field stores other than three, for example, four field stores per channel store, the field stores still being written in and read from cyclically. Where four field stores are used, two are written into while one is read from and one is idle. Such an arrangement is advantageous in a slow motion mode, in which the reproducing heads cross the oblique tracks at an acute angle, and on each pass may therefore pick up data from two different fields. Any such reproduced data which includes a block address enabling it to be allocated to the correct field can then be stored in the field store appropriate to that field, and writing in a field store only ceases when all the data of the field being written therein has been recovered.

Moreover, the invention can also be applied to an arrangement where, contrary to what is shown in and has been described with reference to FIG. 1, non-azimuth recording and reproduction is used. In such a case, the arrangement shown in FIG. 1 can be modified such that each of the inner code decoders 1, 2, 3 and 4 is connected to each of the channel stores 5, 6, 7 and 8.

We claim:

1. A video replay store for a multi-channel digital video tape recorder, the video replay store, comprising:
   a respective channel store for each channel, each said channel store comprising a plurality of field stores which are written in and read from cyclically;
   a respective field boundary detector for each channel, each said field boundary detector supplying a first pulse in response to each field boundary where an odd field changes to an even field, and a second pulse in response to each field boundary where an even field changes to an odd field, in the off-tape data in the respective channel;
   a replay store controller for supplying write requests and read requests in a predetermined sequence to all of said channel stores, said replay store controller stepping on from one state to a next state in said predetermined sequence in response to stepping pulses formed by each first said first pulse following a said second pulse and each first said second pulse following a said first pulse; and
   a control circuit for each said respective channel store, each said control circuit including a first gate circuit for gating each write request received from said replay store controller with a read request received from said replay store controller so as to derive a first output signal used to form a write enable, and a second gate circuit for gating each read request received from said replay store controller with said first output signal to derive a second output signal used to form a read enable, whereby said control circuit supplies write enables and read enables to said field stores with read enables dominating over write enables in the event of contention between a read enable and a write enable.

2. A video replay store according to claim 1 wherein said replay store comprises a memory storing said predetermined sequence, said memory stepping on to the next state in said predetermined sequence in response to each said stepping pulse and thereupon supplying the next write request and the next read request in said predetermined sequence, first and second latch circuits in which said next write request and said next read request respectively are latched in response to an output field synchronizing signal, the output of said first latch circuit forming the output read request of said replay store controller, and a third latch circuit in which the output of said second latch circuit is latched in response to the next said stepping pulse, the output of said third latch circuit forming the output write request of said replay store controller.

3. A video replay store according to claim 2 wherein said memory is a programmable read-only memory.

4. A video replay store according to claim 1 wherein said plurality is three.

5. A video replay store according to claim 1 wherien said plurality is four.

6. A video replay store according to claim 1 comprising two said channel stores.

7. A video replay store according to claim 1 comprising four said channel stores.

* * * * *